July 3, 1923.
B. J. STEEN ET AL
STUMP REMOVER
Filed Feb. 13, 1922
1,460,617
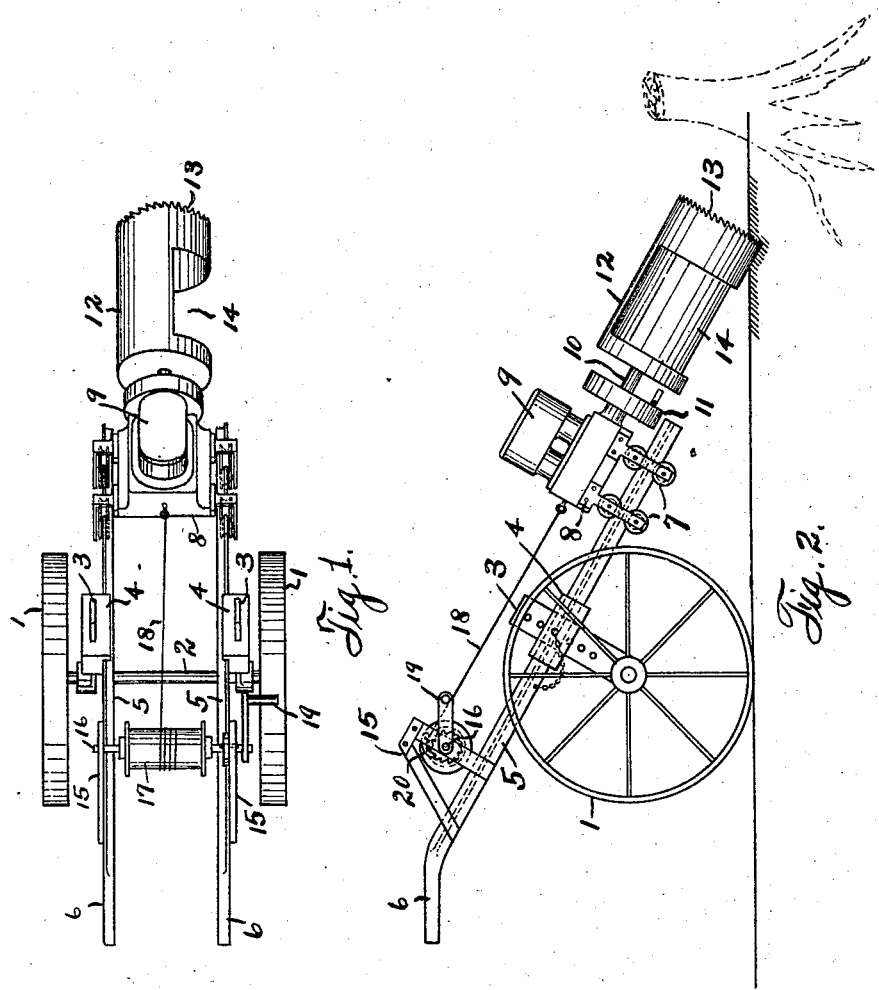
Inventor
Buford J Steen and
William O. Martin
By Hardway Rathy Attorneys Patented July 3, 1923.

1,460,617

UNITED STATES PATENT OFFICE.

BUFORD J. STEEN AND WILLIAM O. MARTIN, OF CHRISTINE, TEXAS.

STUMP REMOVER.

Application filed February 13, 1922. Serial No. 536,303.

*To all whom it may concern:*

Be it known that we, BUFORD J. STEEN and WILLIAM O. MARTIN, citizens of the United States, residing at Christine, in the county of Atascosa and State of Texas, have invented certain new and useful Improvements in a Stump Remover, of which the following is a specification.

This invention relates to new and useful improvements in a stump remover.

One object of the invention is to provide a device of the character described specially designed for cutting off and removing stumps, and the like.

Another object of the invention is to provide a device of the character described which is so constructed that it may be easily handled and moved from place to place.

With the above and other objects in view the invention has particular relation to certain novel features of construction, operation and arrangement of parts, an example of which is given in this specification and illustrated in the accompanying drawings, wherein:—

Figure 1 is a plan view of the device and,
Figure 2 is a side view thereof.

In the drawings, the numerals 1, 1 designate the carrier wheels which support the axle 2. Upstanding from said axle, adjacent the wheels are the standards 3, 3 on which the adjustable bearings 4, 4 are mounted to be adjusted up or down. Secured to these bearings are the respective tracks 5, 5, which form a supporting frame work and whose rear ends are formed into handles 6, 6. Mounted upon said tracks, by means of suitable rollers 7, there is a motor frame 8 which carries a motor 9, preferably of the internal combustion type. The motor drive shaft 10 projects forwardly and has the fly wheel 11 fixed thereon. Fastened to the front end of this drive shaft there is a circular, drum like saw 12 whose free end is serrated forming the teeth 13. One side of this saw has a cut away portion 14, for a purpose to be hereinafter stated.

Near their rear ends the tracks have the frames 15, 15 fixed thereto in which the drum shaft 16 has bearings and mounted on this shaft between the tracks there is a drum 17. A cable 18 is attached at one end to the motor and its other end is wound around said drum. One end of the shaft 16 has a crank 19 fixed thereon, by means of which the drum may be turned and the cable wound therearound, and the motor 9 and saw 12 thus adjusted on the tracks. The drum may be held against turning in the reverse direction by means of a suitable rack-and-dog arrangement 20.

The machine is held against the work by the operator who controls it through the handles 6. When in operating position the tracks 5 will be tilted forwardly and the saw will be held against the work by reason of its own weight, and that of the motor 9 and as the work progresses the machine may be gradually moved forwardly until the stump is cut off. Any material collecting in the drum will fall out through the opening 14.

In cutting small stumps the work may be completed from one side, but in cutting larger stumps it may be found necessary to move the machine around the stump and cut in from all sides until the stump is cut in two.

What we claim is:

A device of the character described including an axle, carrier wheels supporting the same, standards adjacent said wheels and upstanding from said axle, a vertically adjustable bearing on each standard, tracks secured to said bearings forming a supporting framework, and whose rear ends are formed into handles, a motor frame mounted to move on said tracks, a motor carried by said frame having a forwardly projecting drive shaft, a fly wheel fixed on said shaft, a tubular saw fastened to the forward end of said shaft, a cut away portion in one side of said saw, frames fixed on said tracks near their rear ends, a rotatable drum shaft mounted in suitable bearings carried by said frame, a drum fixed on the drum shaft between said tracks, a cable attached at one end to the motor and whose other end is wound around the drum, means for rotating the drum in one direction, and means for locking said drum against rotation in the other direction.

In testimony whereof we have signed our names to this specification in the presence of two subscribing witnesses.

BUFORD J. STEEN.
WILLIAM O. MARTIN.

Witnesses:
WM. A. CATHEY,
JAS. W. OLIVER.